Aug. 15, 1933.  S. MENTON  1,922,057
WINDOW CONSTRUCTION
Filed Feb. 13, 1932   3 Sheets-Sheet 1
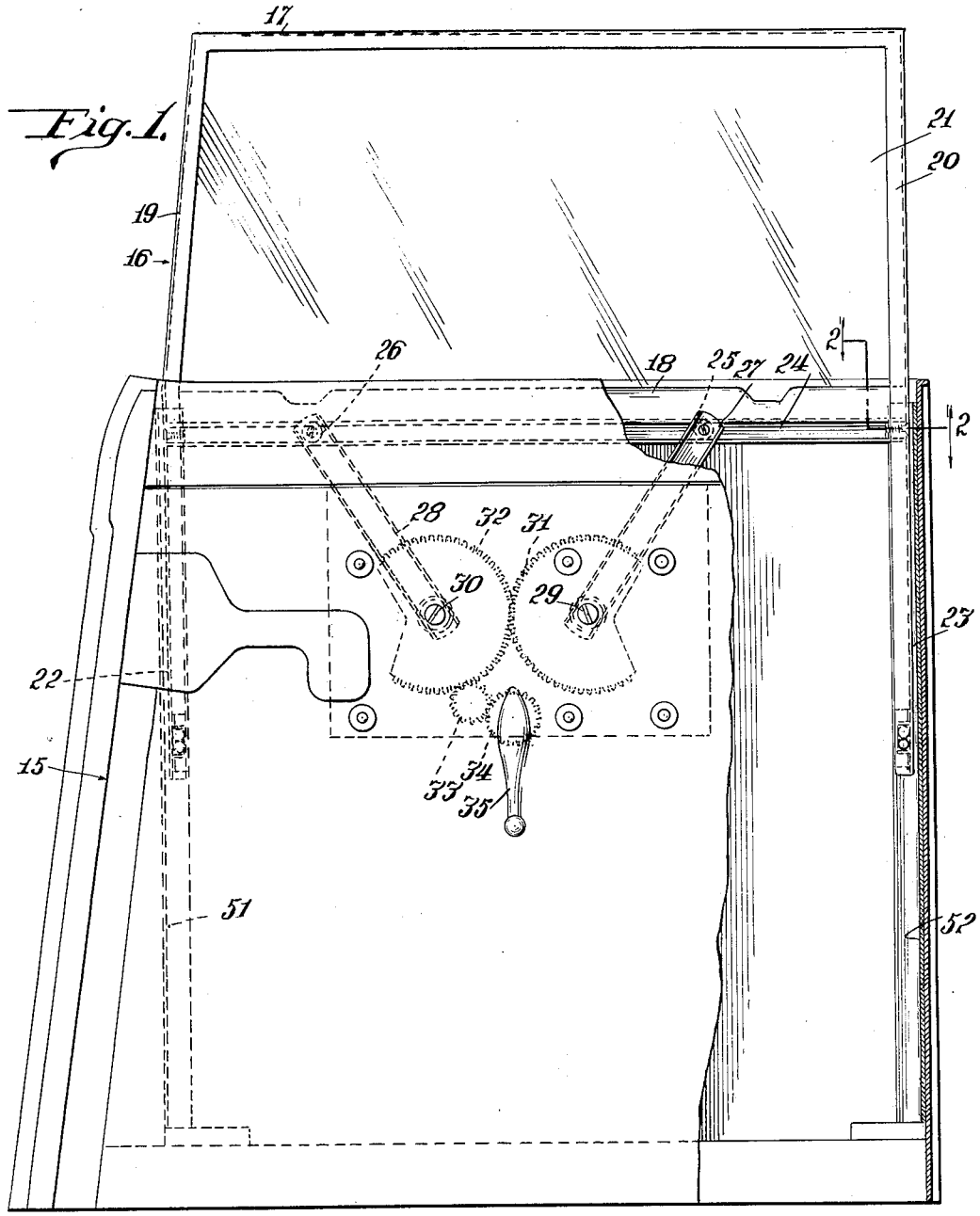
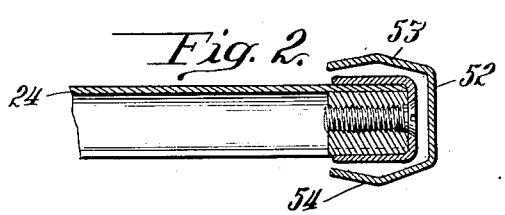
Inventor
Stanley Menton
By Roy A. Anderson
Attorney.

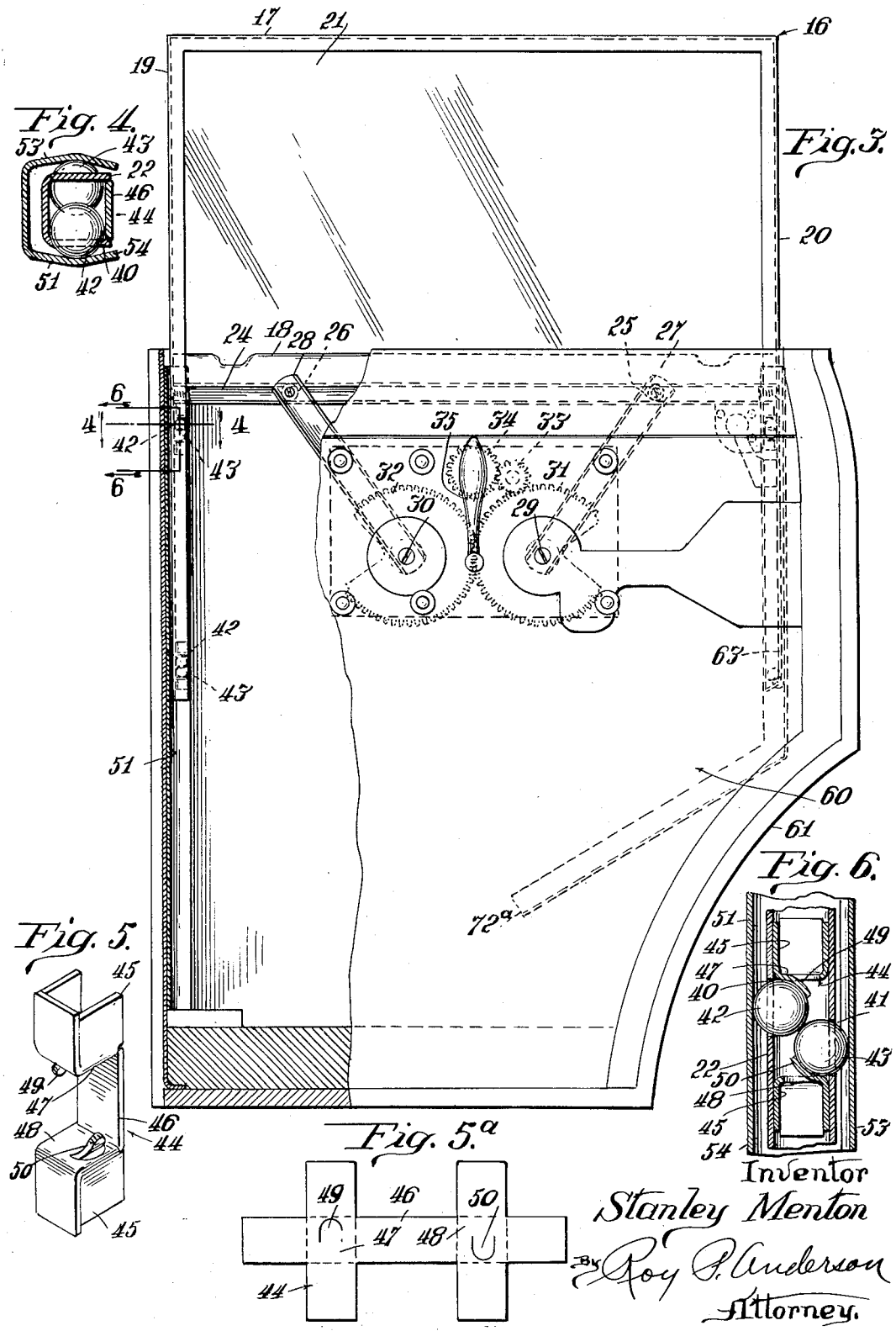

Aug. 15, 1933.  S. MENTON  1,922,057
WINDOW CONSTRUCTION
Filed Feb. 13, 1932  3 Sheets-Sheet 3
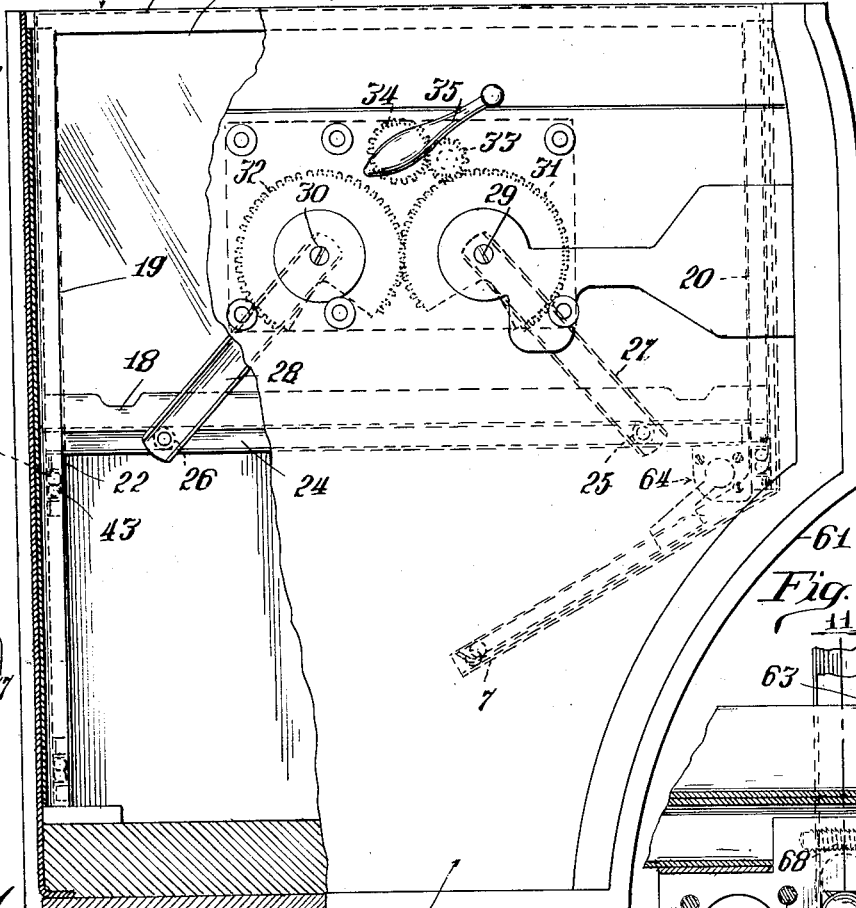
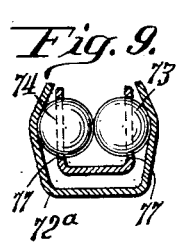
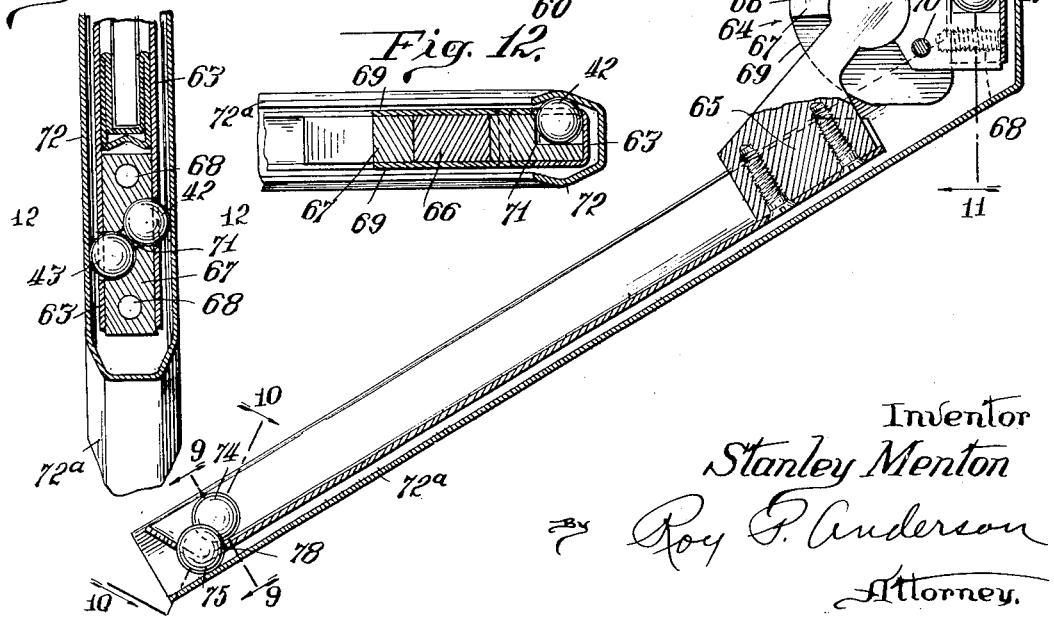
Inventor
Stanley Menton
By Roy P. Anderson
Attorney.

Patented Aug. 15, 1933

1,922,057

UNITED STATES PATENT OFFICE 1,922,057

WINDOW CONSTRUCTION

Stanley Menton, Kalamazoo, Mich., assignor to Limousine Body Company, Kalamazoo, Mich., a Corporation of Michigan Application February 13, 1932. Serial No. 592,730

17 Claims. (Cl. 296—48)

This invention relates to window construction, and more particularly to window constructions such as are now used extensively in motor vehicle bodies of the so-called sedan and convertible types, the windows being adapted to be raised or lowered at the will of the occupants of the vehicle.

In the drawings, which illustrate preferred embodiments of the invention—

Fig. 1 is a side elevation of the front door of a motor vehicle body of the convertible type having a window frame vertically slidable therein and shown in raised position, parts being broken away and other parts being shown in section for the purpose of clearance;

Fig. 2 is a sectional view taken on a plane indicated by the line 2—2 in Fig. 1;

Fig. 3 is a view similar to Fig. 1, showing the invention applied to the rear door of a motor vehicle body of the convertible type;

Fig. 4 is a sectional view taken on a plane indicated by the line 4—4 in Fig. 3;

Fig. 5 is a perspective view of a cage or retainer for maintaining the anti-friction ball bearings in position in the window frame channel;

Fig. 5a is a plan view of the blank from which the retainer shown in Fig. 5 is made;

Fig. 6 is a sectional view taken on a plane indicated by the line 6—6 in Fig. 3;

Fig. 7 is a view similar to Fig. 3 but showing the window frame in lowered position;

Fig. 8 is an enlarged detail sectional view of a portion of the construction shown in Fig. 8;

Figs. 9, 10, and 11 are sectional views taken on planes indicated by the lines 9—9, 10—10, and 11—11, respectively, in Fig. 8; and Fig. 12 is a sectional view taken on a plane indicated by the line 12—12 in Fig. 11.

Referring now more particularly to the drawings, the reference character 15 indicates a front door of an automobile which in the present instance is illustrated as one particularly adapted for use in an automobile body of the convertible type, the door terminating at its upper edge at substantially the belt line of the body. Vertically slidably mounted within the door 15 is a window frame 16 having upper and lower cross members 17 and 18 and front and rear members 19 and 20 of U-shaped cross-section, within which members is disposed a pane of glass 21. The frame 16 is provided with rigid front and rear depending legs 22 and 23 which are formed as continuations of the front and rear members 19 and 20, respectively, and act to maintain the frame 16 rigid when the latter is in raised position and prevent lateral movement thereof.

Secured between the depending legs 22 and 23, just below the lower cross member 18 of the frame, is a channel member 24 within which channel are adapted to ride rollers 25, 26, carried by arms 27 and 28, respectively, of the window regulator mechanism. The arms 27 and 28 are pivotally mounted on pins 29, 30, respectively, and are secured to segments 31, 32 respectively, the latter being in constant mesh. Meshing with the segment 32 is a gear 33 which in turn meshes with a gear 34, the latter being secured to and adapted to be rotated in either direction by means of the operating handle 35. By turning the lever 35 one way or the other, the window frame may be raised or lowered, or adjusted to any desired position.

Disposed in each of the depending legs 22 and 23, near the upper and lower ends thereof and projecting laterally outwardly from the leg members through openings 40, 41, therein (Fig. 6), are pairs of steel balls 42, 43, which are maintained in position by means of a cage or retainer 44. The retainer 44 is formed from a flat piece of sheet metal of the shape of a double barred cross (see Fig. 5a), the projecting portions of each cross being bent in the same direction through angles of 90° to form a box-like portion 45 at each end of the retainer and the connecting portion 46 of the two crosses being bent on lines colinear with the adjacent edges of the cross members through angles of 90° thus forming a retainer such as shown in perspective in Fig. 5. The confronting faces 47, 48 of the box-like portions are provided with struck out tongues 49, 50, which are adapted to engage the balls 42, 43 (see Fig. 6) when the retainers are assembled with the depending legs 22, 23. After the retainers are positioned within the channeled legs 22, 23 they are spot-welded in position through one or more sides of the box-like portions 45.

The sides of the channel-shaped legs form with the confronting faces 47, 48 of the box-like portions of the retainer and the connecting portion 46 thereof a substantially closed chamber and this chamber may be filled with a lubricant, such as grease, to reduce friction of the balls during operation thereof, and thereby insure extremely easy and smooth operation of the window frames within their guiding channels, which will now be described.

Disposed within the door 15, and within which the window frame 16 is adapted to slide, are guide channels 51 and 52, each of which have their flanges 53, 54 concaved inwardly as shown in Figs. 2 and 4 of the drawings. In making the channels 51 and 52, the horizontal distance between the widest part of the flanges is made slightly less than the horizontal distance between the outer extremities of the opposing balls, so that when the frame is placed in the guide channels, the flanges thereof will yield slightly and thereafter exert a pressure against the balls to maintain them in constant contact with each other as shown in Fig. 6, and provide a tight fit between the balls carried by the frame and the guide channels. This construction maintains the frame 16 in spaced relation to the guide channels as shown in Figs. 2, 4, and 6, and provides through the balls 42, 43 a metal to metal contact and a very rigid connection between the frame and guide channels, thereby eliminating the necessity of felt guide channels heretofore used, and, consequently, reducing to a minimum the possibility of the development of objectional rattles, which invariably developed in prior art structures of this nature.

It will be clear from the foregoing that as the window frame is raised or lowered by means of the operating handle 35, the steel balls 42 and 43 will roll upon each other and within the grooved track formed by the concave flanges 53, 54 of the guide channels 51, 52, and that the friction to be overcome is negligible, thereby providing a simple and easy running window structure. Furthermore, by virtue of the novel connection between the guide channels and frame, the latter is positively precluded from becoming tilted in the guides and thereby prevented from jumping out of the guides.

In Figs. 3 and 7 to 12, inclusive, the present invention is shown as modified for application to a rear automobile door. A rear door, such as shown at 60 in Figs. 3 and 7, is ordinarily provided with a cutaway portion 61 where it overlies the rear fender of the car, and this construction prevents complete lowering within the door of a window frame having rigid depending leg portions such as shown in Fig. 1. In order to overcome this difficulty and permit complete lowering of the window in the rear door, the rear depending leg 63 of the rear window frame is hinged as at 64 to the frame 16, and is adapted to be pivoted around this point during lowering of the frame to permit complete lowering of the same. The other parts of the rear window frame are similar in construction to corresponding parts of the front window frame, and the same reference characters are therefore employed to designate similar corresponding parts of the front and rear door constructions.

Referring to Fig. 8, where the construction of the rear depending leg of the rear window frame is shown on an enlarged scale and more in detail, it will be seen that the leg 63 has secured thereto a hinge part 65 having a cylinder head 66 disposed within a complementary hinge part 67 secured to the lower extremity of the rear member 20 of the window frame 16 just below the channel 24, by means of the screws 68. The head 66 of hinge portion 65 is maintained in position within the hinge portion 67 by means of plates 69 on opposite sides of the hinge portions and which are secured together by means of rivets or bolts 70 passing through holes in the hinge part 67. This type of hinge construction provides a very rigid leg in a direction transverse of the center line of the automobile and prevents lateral movement of the window frame in this direction when the frame is in its raised position and liable to be subjected to lateral forces. The hinge part 67 also serves as the upper cage or retainer for the steel balls 42, 43 and for this purpose it is provided with an opening 71 therein for the reception of the balls 42 and 43. This opening is so formed as to maintain the balls in contact with each other and in such relation as to bear against the sides of the guide channel within which the window frame is disposed. See particularly Figs. 8 and 11.

The forward guide channel in the rear door is similar to the forward guide chanel 51 of the front door and it is designated by the same reference character, but the rear guide channel in the rear door is composed of an upper vertical portion 72 and a lower angular portion 72a, the latter portion being provided to avoid interference of the rear depending leg of the frame with the cutout portion 61 of the door and cause pivotal movement of the hinged leg portion 63 to permit complete lowering of the window frame within the door. The rear guide channel has its flanges concaved inwardly in a manner similar to the construction of the guide channels described in connection with the front door construction.

In order to guide the lower end of leg 63, the same is provided with steel anti-friction balls 73, 74, and 75, the balls 73 and 74 projecting laterally outwardly through apertures 77 in the flanges of the channeled leg portion 63 to engage the concave flanges or sides of the guide channel 72, 72a, and the ball 75 projecting through an aperture 78 in the web of the channeled leg 63 to engage the bottom of the guide channel 72, 72a. The balls 73, 74, and 75 are so disposed that each ball engages each of the other balls and the guide channel thereby providing a simple and easy running window construction. See Figs. 8, 9, and 10.

The rear window is operated in a manner similar to that described in connection with the front door, but it will be seen that upon lowering of the window in the rear door the ball 75, upon encountering the inclined portion 72a of the rear channel, will cause the arm 63 to be pivoted around its hinge 64 until the window frame 16 has reached its lowermost position, at which time the leg 63 will assume the position shown in Figs. 7 and 8. Since the channel 72, 72a has its side flanges concaved inwardly in a manner similar to the channels 51 and 52, confinement of the balls 73 and 74, and, hence, the lower end of leg 63 within the inclined portion 72a of the channel is assured. Upon raising of the rear window it will be seen that the lower end of the leg 63 will always be maintained within the channel 72a by the balls 73 and 74 and will reassume its vertical position when the window reaches its fully raised position as shown in Fig. 3. The mechanism for raising and lowering the window is similar to that shown and described in Fig. 1, and therefore further description thereof is deemed unnecessary.

From the foregoing it will be seen that an extremely rigid window construction has been provided which will withstand long and continued service with a minimum of wear on the parts thereof, thereby eliminating the possibility of the development of objectionable looseness and rattles. Furthermore, the construction is easy of operation, simple of design, and economical of manufacture.

Although the foregoing description is necessarily of a detailed character, in order to completely set forth the invention it is to be understood that the specific terminology is not intended to be restrictive or confining, and it is to be further understood that various rearrangements of parts and modifications of structural details may be resorted to without departing from the scope or spirit of the invention.

Having thus described the invention, what is claimed and desired to be secured by Letters Patent is:

1. In a window structure, a window frame having a pair of depending leg portions, a pair of guide channels within which said frame is adapted to slide, and a plurality of pairs of ball bearings carried by said leg portions, the balls of each pair bearing against each other and engaging the sides of the guide channels to provide for easy relative movement between the frame and guide channels.

2. In a window structure, a window frame, a pair of guide channels within which said frame is adapted to slide, and a plurality of pairs of balls carried by the frame, the balls of each pair bearing against each other and engaging the sides of the guide channels to provide for easy relative movement between the frame and guide channels.

3. In a window structure, a window frame, a pair of guide channels having inwardly concaved flanges and within which the frame is adapted to slide, and a plurality of balls carried by the frame and engaging the concave flanges of the guide channels to provide for easy relative longitudinal movement between the frame and channels and prevent relative lateral movement therebetween.

4. In a window structure, a window frame having a pair of depending leg portions, a pair of guide channels having inwardly concaved flanges and within which the frame is adapted to slide, and a plurality of balls carried by the depending leg portions and engaging the concave flanges of the guide channels to provide for easy relative longitudinal movement between the frame and channels and prevent relative lateral movement therebetween.

5. In a window structure, a window frame, a pair of guide channels having inwardly concaved flanges and within which the frame is adapted to slide, and a plurality of pairs of balls carried by the frame, the balls of each pair bearing against each other and engaging the concave flanges of the guide channels to provide for easy relative longitudinal movement between the frame and channels and prevent relative lateral movement therebetween.

6. In a window structure, a window frame having a pair of depending leg portions, a pair of guide channels having inwardly concaved flanges and within which the frame is adapted to slide, and a plurality of pairs of balls carried by the depending leg portions, the balls of each pair bearing against each other and engaging the concave flanges of the guide channels to provide for easy relative longitudinal movement between the frame and channels and prevent relative lateral movement therebetween.

7. A window frame including side members, and anti-friction balls carried by said members and projecting from opposite sides thereof to provide means for reducing to a minimum the friction between the frame and a guiding means, within which the frame is adapted to be disposed, during relative movement between the frame and guiding means.

8. A window frame including side members of channel shaped cross-section, a plurality of pairs of openings in opposite flanges of said channel shaped members, and pairs of ball bearings carried by said members, one pair of ball bearings being provided for each pair of openings and the balls of each pair projecting outwardly from opposite sides of the frame member through said openings to provide means for reducing to a minimum the friction between the frame and a pair of guide channels, within which the frame is adapted to be disposed, during relative movement between the frame and guide channels.

9. A window frame including side members of channel shaped cross-section, a plurality of pairs of openings in opposite flanges of said channel shaped members, and pairs of ball bearings carried by said members, one pair of ball bearings being provided for each pair of openings and the balls of each pair projecting outwardly from opposite sides of the frame member through said openings and bearing against each other within the side members to provide means for reducing to a minimum the friction between the frame and a pair of guide channels, within which the frame is adapted to be disposed, during relative movement between the frame and guide channels.

10. A window frame including side members of channel shaped cross-section, a plurality of pairs of openings in opposite flanges of said channel shaped members, pairs of ball bearings carried by said members and means for maintaining said ball bearings in position within the side members, one pair of ball bearings being provided for each pair of openings and the balls of each pair projecting outwardly from opposite sides of the frame member through said openings and bearing against each other within the side members to provide means for reducing to a minimum the friction between the frame and a pair of guide channels, within which the frame is adapted to be disposed, during relative movement between the frame and guide channels.

11. A window frame including side members of channel shaped cross-section, a plurality of pairs of openings in opposite flanges of said channel shaped members, each pair of openings being arranged in staggered relation, pairs of ball bearings carried by said members and a retainer for maintaining said ball bearings in position within the channel shaped side members, said retainer forming with the flanges of said member a substantially closed chamber for the confinement of lubricant therein, one pair of ball bearings being provided for each pair of openings and the balls of each pair projecting outwardly from opposite sides of the frame members through said openings and bearing against each other within the side members to provide means for reducing to a minimum the friction between the frame and a pair of guide channels, within which the frame is adapted to be disposed, during relative movement between the frame and guide channels.

12. A window frame having depending leg portions which are rigid in a direction transverse to the plane of the frame, one of said legs being hinged to the frame proper to pivot in the plane of the frame, and ball bearings carried by the leg portions to provide for easy relative movement between the frame and guide channels within which the frame is adapted to be disposed, said bearings projecting laterally beyond each side of the frame to engage opposite sides of the channel and which opposite sides of the channel are so formed that they act through said balls to prevent said leg portions from jumping out of said channels.

13. A window frame having depending leg portions which are rigid in a direction transverse to the plane of the frame, one of said legs being hinged to the frame proper to pivot in the plane of the frame and carrying at its lower end a plurality of ball bearings to guide the same along an inclined guide and effect pivotal movement of the hinged leg during relative movement between the frame and the channel, and the other of said legs being provided with a plurality of pairs of ball bearings to provide for easy relative movement between the frame and a guide channel within which the last named leg is adapted to be disposed, the ball bearings of each pair projecting laterally from each side of the frame to engage opposite sides of the channels and which are so formed as to confine said ball bearings in a manner preventing the hinged leg from jumping out of the channel.

14. In a window structure, a window frame having a pair of depending leg portions, a pair of guide channels within which said frame is adapted to slide, one of said channels having a substantially vertical portion and a portion disposed at an angle thereto and one of said depending leg portions being pivotally secured to the frame proper, and a plurality of ball bearings carried by the lower end of the pivoted leg portion to engage opposite sides of the channel and guide the leg and cause pivotal movement of the leg portion during relative movement between the frame and the guide channels, the opposite sides of the guide channel being so formed as to confine said ball bearings and prevent said pivoted leg from jumping out of said channel.

15. In a window structure, a window frame having a pair of depending leg portions, a pair of guide channels having inwardly concaved flanges and within which said frame is adapted to slide, one of said channels having a substantially vertical portion and a portion disposed at an angle thereto and one of said depending leg portions being pivotally secured to the frame proper, and a plurality of ball bearings carried by the lower end of the pivoted leg portion and engaging within the concaved flanges of the channel to guide the pivoted leg portion and cause pivotal movement thereof during relative movement between the frame and the guide channels, said flanges of said channels so engaging the ball bearings carried by said pivoted leg as to confine the same against jumping out of the channel.

16. An automobile door having a cutout portion at one corner thereof, a channel disposed within the door having a substantially vertical portion and a portion disposed at an angle thereto adjacent the cutout portion of the door, a window frame adapted to be raised and lowered within the door and having a pivoted leg portion disposed within the channel, a plurality of balls carried by the lower end of the leg portion and engaging within the channel to provide means for guiding said leg portion and causing pivotal movement thereof during raising or lowering of the window, the sides of the last mentioned channel being so formed as to confine said ball bearings and thus hold said lower end of the leg portion from jumping out of the channel.

17. An automobile door having a cutout portion at one corner thereof, a channel disposed within the door having inwardly concaved flanges and being formed with a substantially vertical portion and a portion disposed at an angle thereto adjacent the cutout portion of the door, a window frame adapted to be raised and lowered within the door and having a pivoted leg portion disposed within the channel, three balls carried by the lower end of the leg portion, two of the balls engaging within the concaved flanges of the channel, the other ball bearing against the web of the channel, and all of the balls constituting means for guiding the leg portion and causing pivotal movement thereof during raising and lowering of the window.

STANLEY MENTON.